(12) United States Patent
Delapierre et al.

(10) Patent No.: US 8,393,223 B2
(45) Date of Patent: Mar. 12, 2013

(54) PRESSURE SENSOR WITH RESISTANCE STRAIN GAGES

(75) Inventors: Gilles Delapierre, Seyssins (FR); Hubert Grange, Grenoble (FR); Patrice Rey, St Jean de Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 842 days.

(21) Appl. No.: 12/279,396

(22) PCT Filed: Jan. 26, 2007

(86) PCT No.: PCT/EP2007/050766
§ 371 (c)(1),
(2), (4) Date: Aug. 28, 2009

(87) PCT Pub. No.: WO2007/096225
PCT Pub. Date: Aug. 30, 2007

(65) Prior Publication Data
US 2010/0031752 A1  Feb. 11, 2010

(30) Foreign Application Priority Data
Feb. 24, 2006 (FR) ..................... 06 01652

(51) Int. Cl.
*G01L 9/04* (2006.01)
(52) U.S. Cl. ............ 73/726; 73/715; 73/727; 361/283.4
(58) Field of Classification Search .......... None
See application file for complete search history.

(56) References Cited

U.S. PATENT DOCUMENTS

| 4,320,664 A | * | 3/1982 | Rehn et al. ............. 73/708 |
| 4,651,120 A | | 3/1987 | Aagard |
| 4,766,666 A | * | 8/1988 | Sugiyama et al. ......... 29/621.1 |
| 4,838,088 A | * | 6/1989 | Murakami ............. 73/724 |
| 5,095,401 A | * | 3/1992 | Zavracky et al. ........ 361/283.4 |
| 5,163,329 A | | 11/1992 | Shimaoka et al. |
| 5,167,158 A | * | 12/1992 | Kamachi et al. ........ 73/727 |
| 5,220,838 A | * | 6/1993 | Fung et al. ............. 73/721 |

(Continued)

FOREIGN PATENT DOCUMENTS

| EP | 0831315 A2 | 3/1998 |
| JP | 06-112509 A | 4/1994 |

(Continued)

OTHER PUBLICATIONS

M. Kandler et al. Journal of Micromechanics and Microengineering, 1992, pp. 199-201, "A miniature single-chip pressure and temperature sensor".

*Primary Examiner* — Lisa Caputo
*Assistant Examiner* — Jermaine Jenkins
(74) *Attorney, Agent, or Firm* — Lowe Hauptman Ham & Berner, LLP

(57) ABSTRACT

A pressure sensor micromachined by using microelectronics technologies includes a cavity hermetically sealed on one side by a silicon substrate and on the other side by a diaphragm that is configured to be formed under the effect of the pressure outside the cavity. The sensor includes at least one resistance strain gage fastened to the diaphragm and has resistance that varies as a function of the deformation of the diaphragm. The diaphragm is fastened to the resistance strain gages. The gages are located inside the sealed cavity. The diaphragm has an insulting layer deposited on a sacrificial layer and may cover integrated measurement circuits in the silicon substrate.

20 Claims, 3 Drawing Sheets

U.S. PATENT DOCUMENTS

| | | | |
|---|---|---|---|
| 5,242,863 A | 9/1993 | Xiang-Zheng et al. | |
| 5,321,989 A | 6/1994 | Zimmer et al. | |
| 5,471,723 A * | 12/1995 | Luder et al. | 29/25.41 |
| 5,600,071 A | 2/1997 | Sooriakumar et al. | |
| 5,844,287 A | 12/1998 | Hassan et al. | |
| 5,879,572 A * | 3/1999 | Folsom et al. | 216/49 |
| 5,891,751 A * | 4/1999 | Kurtz et al. | 438/53 |
| 5,955,659 A * | 9/1999 | Gupta et al. | 73/54.01 |
| 6,470,754 B1 * | 10/2002 | Gianchandani | 73/718 |
| 7,288,464 B2 * | 10/2007 | Haluzak et al. | 438/455 |
| 7,436,037 B2 * | 10/2008 | Kurtz et al. | 257/419 |
| 7,555,956 B2 * | 7/2009 | Benzel et al. | 73/714 |
| 7,622,782 B2 * | 11/2009 | Chu et al. | 257/415 |

FOREIGN PATENT DOCUMENTS

| | | |
|---|---|---|
| JP | 2000-022172 A | 1/2000 |
| JP | 2000-124468 A | 4/2000 |
| JP | 2005-502848 A | 1/2005 |

* cited by examiner

PRESSURE SENSOR WITH RESISTANCE STRAIN GAGES

CROSS-REFERENCE TO RELATED APPLICATIONS

The present Application is based on International Application No. PCT/EP2007/050766, filed on Jan. 26, 2007, which in turn corresponds to French Application No. 0601652 filed on Feb. 24, 2006, and priority is hereby claimed under 35 USC §119 based on these applications. Each of these applications are hereby incorporated by reference in their entirety into the present application.

FIELD OF THE INVENTION

The invention relates to pressure sensors and more especially to those fabricated by collective fabrication technologies used in microelectronics: production of multiple sensors on a single wafer by deposition of insulating, conductive or semiconductor layers, photoetching, doping, etc., followed by cutting the wafer into individual chips each corresponding to a sensor, and finally encapsulation of each sensor chip.

BACKGROUND OF THE INVENTION

There are numerous applications of these sensors: atmospheric pressure measurement, vehicle tire pressure measurement, etc.

Microelectronics technologies make it possible to carry out, on one and the same chip, both the micromachining of mechanical components and the formation of electronic circuits associated with these mechanical components. In a pressure sensor, the mechanical components essentially comprise a cavity sealed off by a deformable diaphragm. The electronic transducer elements comprise strain gages or capacitor plates associated with the diaphragm, and active circuits for detecting the changes in resistance or in capacitance as a function of the deformation of the diaphragm.

The advantage of microelectronics technologies is that they allow the fabrication cost of the sensors to be considerably reduced. Now, the fabrication cost is particularly critical in many applications and especially in commercial applications (for example the automobile market, for detecting tire pressure).

However, the technologies devised hitherto are not optimal from the cost standpoint, in particular because of the complexity introduced by the production of the mechanical components, which requires steps being added to the steps for fabricating the electronic circuit elements.

To give an example, the following solutions have already been proposed:

a (FIG. 1): the joining of two plates, for example a glass plate 10 and a silicon plate 12, bonded together, the empty cavity (denoted by the letter V) being hollowed out right through the thickness of the silicon plate and being sealed off on one side by the glass plate 10 and on the other side by a thin diaphragm 14 that remains in the upper part of the recessed plate 12. Metal strain gages 16, 18 are deposited on this diaphragm, with an insulating layer 20 interposed between the silicon diaphragm 14 and the gages;

b (FIG. 2): similar to FIG. 1, but the strain gages, instead of being produced by deposited metal layers, are doped zones 22, 24 of the silicon of the diaphragm. Their doping is the reverse of that of the diaphragm and said doped zones are isolated from the diaphragm only by the reverse junction formed between these doped zones and the diaphragm. The fabrication is simpler, the piezoresistive sensitivity of these doped zones is very good when the diaphragm deforms, but the isolation is not good and leads to operating defects, notably when the temperature rises;

c (not shown, similar to FIG. 1): the strain gages are portions of a polycrystalline silicon layer deposited on the insulating layer 20, instead of the metal strain gages 16 and 18. The sensitivity is intermediate between that of metal resistance strain gages and that of gages based on doped single-crystal silicon zones, solutions a, b and c requiring a treatment of the silicon plate via its rear face, in order to hollow out the cavity V, thereby appreciably complicating the fabrication, and, additionally, measures having to be taken to protect the strain gages from external, chemical or electrical, attack;

d (FIG. 3): to avoid treating the rear face and to avoid having to protect the strain gages after fabrication, more complex structures comprising two silicon plates have been proposed: a lower plate 12 having the cavity and optionally electronic circuits and strain gages, and an upper plate 26 sealing the cavity and thinned down at the cavity so as to retain only the thin diaphragm 14. This solution is very complex and costly, being reserved for professional applications—notably, it requires onerous measures to be taken to make the electrical output connections from the sensor right through the entire thickness of the first plate 12; and e (FIG. 4): to eliminate the drawbacks of the above solutions, and to be able to integrate both the mechanical components (cavity, diaphragm) and the electronic circuit elements onto the same substrate, it has been proposed to eliminate the strain gages and to detect the pressure via variation in capacitance, the diaphragm 14 being conductive and constituting one electrode, and another electrode 28 being formed in the silicon substrate. The diaphragm 14 is formed by a polycrystalline silicon layer suspended above the silicon plate 12, the empty cavity V being formed between the plate and the diaphragm. Electronic circuits may be integrated in the silicon plate 12, so as to constitute, on the same substrate, both the mechanical components (cavity, diaphragm) and the integrated measurement circuit. Such a solution is described in U.S. Pat. No. 5,321,989 and in the article by M. Kandler et al. in the Journal of Micromechanics and Microengineering 1992 pp. 199-201 entitled *"A miniature single-chip pressure and temperature sensor"*. This solution assumes that a large sensor area is consumed, since the capacitances are low, and a wide electrode 28 facing the diaphragm 14 has to be provided. In addition, the pressure measurement is very temperature-dependent and it is necessary in practice to provide a differential measurement with two similar capacitors (to the left and to the right in FIG. 4), one of which is formed with the aid of the diaphragm 14, which can deform under the effect of pressure, and the other is similar but formed from a nondeformable or almost nondeformable diaphragm 141. The relative nondeformability of the second diaphragm may be obtained by depositing thick layers on top of this diaphragm, but the capacitances thus obtained are not sufficiently identical and the temperature compensation is not perfect. This solution has a very large footprint and is therefore expensive. In addition, the diaphragm is conductive and remains subject to external electrical influences that may disturb the measurement. It is also sensitive to chemical influences. Finally, the diaphragm is deposited at 600° C. or higher and must therefore be deposited before certain operations of producing the integrated electronic circuits in the substrate. There is therefore a need to adapt the electronic circuit production according to the steps specific to the mechanical components, and this dependence impedes subsequent circuit production technology developments.

SUMMARY OF THE INVENTION

The object of the invention is to provide a pressure sensor that is easier to produce and less expensive (for the same performance) than the sensors of the prior art. To do this, the invention departs from the notion of using semiconductor strain gages (although these are much more sensitive) and from the notion of using a capacitive measurement, although capacitive measurements are those that have, in the prior art, allowed the production on the same substrate both of the mechanical components and the electronic measurement circuits of the sensor.

The invention provides a pressure sensor produced in a microelectronics technology, comprising a cavity hermetically sealed at the bottom by a substrate and at the top by a diaphragm that can deform under the effect of the pressure outside the cavity, the sensor comprising at least one resistance strain gage fastened to the diaphragm and having a resistance that varies as a function of the deformation of the diaphragm, characterized in that the diaphragm is formed by a deposited layer of insulating material and the resistance strain gage fastened to this layer of insulating material is located inside the sealed cavity, beneath the diaphragm.

The cavity may cover the major part of the measurement circuits associated with the strain gages, so that it is unnecessary for the electronic circuits of the sensor to be provided outside the cavity on the substrate.

The cavity is located on top of the substrate, and this substrate is not recessed, unlike the substrate of the prior strain-gage sensors.

The resistance strain gages are intrinsically protected from external attack since they are located inside the cavity.

Preferably, an electronic circuit is integrated in the substrate and the resistance strain gage is electrically connected to this integrated electronic circuit.

The diaphragm preferably consists of a thin insulating layer comprising a part deposited on the substrate and a part suspended above the substrate, this part being self-supporting and separated from the substrate by the sealed cavity.

Preferably, the diaphragm is made of silicon nitride, which offers a very good resistance to chemical attack and is preferably deposited by PECVD (plasma-enhanced chemical vapor deposition). Preferably, the resistance strain gages are joined together as a four-resistor Wheatstone bridge.

The electronic circuits associated with the strain gage are preferably located at least partly beneath the diaphragm, thereby saving space.

The self-supporting diaphragm and the resistors may be fabricated after all the other circuit elements have been produced, and therefore the fabrication can be carried out independently of the technology used for these other circuit elements.

To produce a strain-gage pressure sensor comprising a cavity sealed by a diaphragm, the invention provides a manufacturing process comprising the following steps: production of measurement electronic circuit elements on a substrate plane; deposition of a sacrificial layer intended to define the volume of an empty cavity, and etching of this layer so as to leave an island of sacrificial layer located above the electronic circuit elements; deposition of a thin resistive layer on the sacrificial layer and etching of the resistance strain gages in the resistive layer; deposition on the strain gages and on the sacrificial layer of at least one insulating layer that will subsequently form a self-supporting diaphragm fastened to the strain gages; etching of this insulating layer so as to leave a diaphragm covering the entire sacrificial layer with the exception of at least a small aperture at the point where the insulating layer is in contact with the sacrificial layer; etching of the sacrificial layer through the small aperture by a chemical etchant that does not etch the material of the resistance strain gages, so as to remove the totality of this layer; and deposition of a plugging material, for plugging up the small aperture so as to hermetically seal the cavity.

The deposition of the plugging material is preferably carried out at very low pressure so that the cavity then remains void. The sensor therefore delivers an absolute pressure measurement. However, it would also be conceivable for the cavity to be filled with air or with gas, the pressure measurement then being a relative pressure.

Although the resistance strain gages are less sensitive to deformation than semiconductor (silicon) strain gages, it has been found that the advantages of this particularly inexpensive fabrication process largely compensate for the drawbacks of using less sensitive gages.

In one advantageous embodiment, the sacrificial layer is made of tungsten and, notably in this case, the strain gages may be made of nickel/chromium/silicon or nickel/copper/manganese alloys. This embodiment will notably be used in the cases in which the cavity has a small thickness, notably less than one micron.

In another advantageous embodiment, notably for cavities of greater thickness (typically 1 to 10 microns), the sacrificial layer will preferably be made of a polymer material and the gages made of a nickel/chromium/silicon alloy or a nickel/copper/manganese alloy or a nickel/chromium/iron alloy. The polymer material will preferably be a negative photoresist etched by an oxygen plasma.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
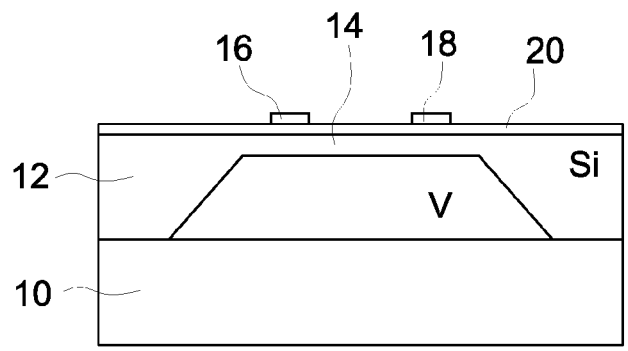
FIGS. 1 to 4, already described, show pressure sensors of the prior art.
Figure 2:
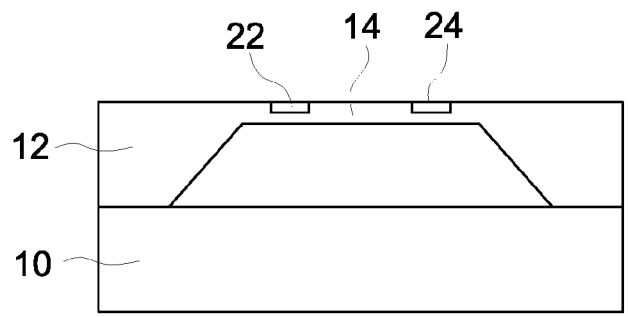
Figure 3:
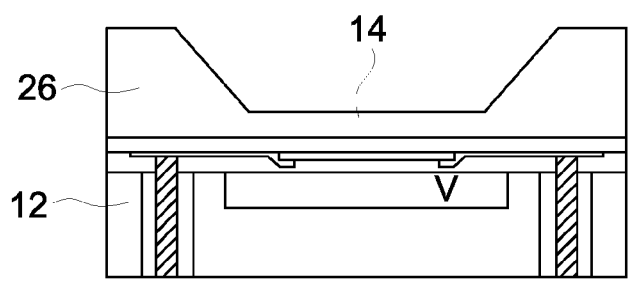
Figure 4:
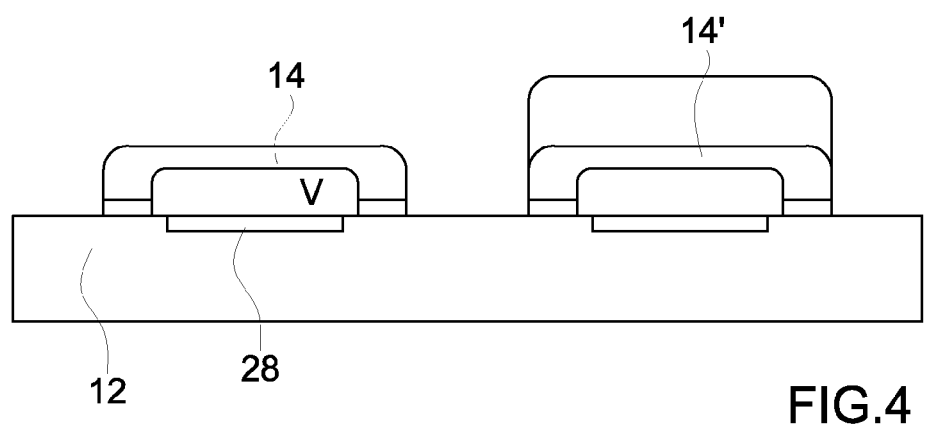
Figure 5:
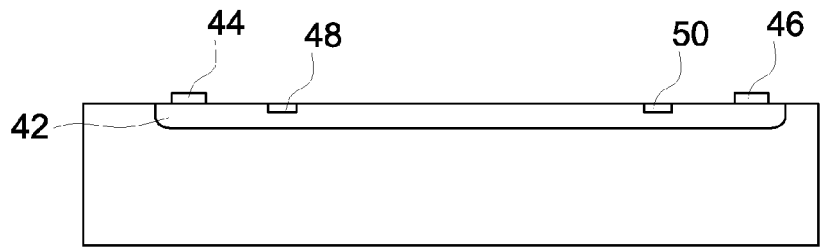
FIGS. 5 to 10 show successive steps in the production of the sensor according to the invention.

The process for producing the pressure sensor according to the invention starts with a semiconductor wafer intended for the collective fabrication of several individual sensors, each sensor comprising, firstly, a cavity sealed by a deformable diaphragm and, secondly, all the circuit elements necessary for producing an electrical measurement signal representative of the pressure exerted on the diaphragm from outside the cavity, for example the ambient pressure in the environment in which the sensor is placed. The wafer will be diced at the end of fabrication into individual chips and each sensor chip will be individually encapsulated in a package. Only one wafer portion corresponding to an individual sensor is shown in FIG. 5, and this planar wafer portion will constitute what is called hereafter the substrate 40 of the sensor.

Preferably, the wafer is a single-crystal silicon wafer. It may also consist of a single-crystal silicon epilayer deposited on a different substrate. All the electronic circuits, with the exception of the strain gages, are fabricated prior to the formation of the cavity and the deformable diaphragm, this situation being particularly advantageous. These circuits may be produced in any microelectronics technology, and notably conventional technologies used for producing MOS circuits, CMOS circuits, bipolar circuits, biCMOS circuits, etc.

This production of the circuits will not be discussed in detail, as it is independent of the steps specifically relating to the invention. Simply represented schematically in FIG. 5 is a surface zone 42, which includes the electronic circuits for an individual sensor that are integrated on the front face of the semiconductor substrate 40. Also represented are two external output contact pads 44 and 46, showing that the sensor may be connected to the outside via contacts made on the front face of the wafer. Finally, two contact areas 48 and 50 are shown, which will serve for connecting the strain gages (not yet produced at this stage) to the other circuit elements.

At this stage, the upper surface of the substrate 40 is overall planar, even though a slight relief associated with the successive deposition and etching steps is present. The term "planar surface" is understood to mean that the substrate has not been recessed to form a cavity. Moreover, the substrate has not been recessed on its rear face side either.

Figure 6:
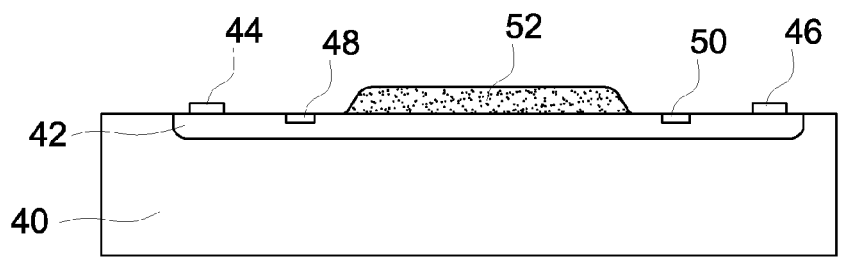

The next step (FIG. 6), which is the first step in producing the mechanical components of the pressure sensor, comprises the deposition of a sacrificial layer 52, i.e. a layer that will be subsequently removed. The thickness of the layer is the desired thickness of the cavity to be produced, for example a few microns. The layer is etched in a pattern that corresponds exactly to the desired volume of the cavity, and this etching operation leaves an island of sacrificial layer. The shape of this island may be circular, for example with a diameter of about 100 microns. The sacrificial layer island may very well cover circuit elements integrated in the substrate, for example the measurement amplifiers needed to deliver an exploitable electrical signal. It may even cover the major part of the integrated circuit elements. However, the island does not cover the contact areas such as 48 or 50, nor the external output contact pads 44, 46. The material of the sacrificial layer is selected according to the need to be able to easily remove this material in a subsequent step, without damaging the circuit elements that were produced previously. It is possible to use mineral materials or organic materials. A polymer such as a polyamide or a photoresist is particularly appropriate, or else a metal such as tungsten. The material must be different from the material that will be used to form the diaphragm, so that the sacrificial layer can be removed by selective etching, without etching the diaphragm. The material of the sacrificial layer must in all cases be able to be etched by anisotropic etching, as will be seen later. Finally, it must be able to be etched without etching the material of the strain gages.

Figure 7:
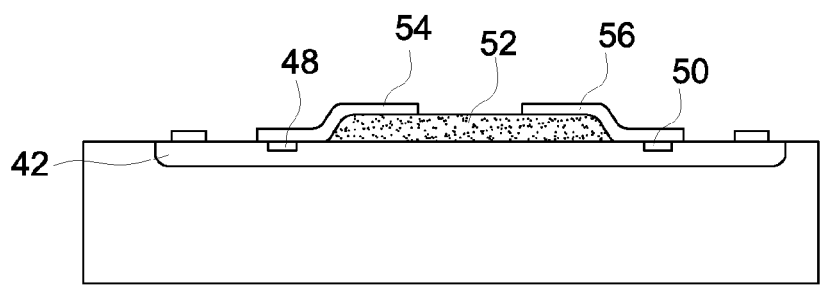

The next step (FIG. 7) consists in depositing then etching a thin layer defining the resistance strain gages such as 54 and 56. Many materials may be used to produce the gages, typically metals such as nickel, iron, chromium or alloys formed from these metals or from yet other materials. The preferred materials are those that have a high resistivity and a low temperature dependence. Preferably, the deposition is carried out by low-temperature cathode sputtering, notably if the sacrificial layer is made of an organic material.

In the case of a sacrificial layer made of tungsten, a very suitable gage material will for example be a nickel/chromium/silicon alloy, preferably in respective proportions of about 0.5/0.4/0.1 ($Ni_{0.5}/Cr_{0.4}/Si_{0.1}$). This alloy is not etched by the bath for etching tungsten (such as an aqueous solution containing 34 g $KH_2PO_4$, 13 g KOH and 33 g $K_3Fe_6$ per liter of water). Although the etching selectivity is not so good, it is also possible to use a copper/nickel/manganese alloy in proportions of about 0.55/0.44/0.01, such as constantan ($Cu_{0.55}Ni_{0.44}Mn_{0.01}$). With a sacrificial layer made of a polymer, there is a very wide choice of gage materials, the etchants for the sacrificial layer having a very low activity with respect to the mineral materials of which the gages are made.

The layer of strain gage material is etched so that:
  one or more resistors of desired resistance are produced above the sacrificial layer, typically four resistors that will be connected as a Wheatstone bridge. The resistance may typically be from a few hundred ohms to a few thousand ohms, this being able to be obtained with layer thicknesses of 5 to 500 nanometers for example; and
  the ends of these resistors are connected to the integrated circuit 42, for example via the contact areas 48 and 50 provided on the surface of said circuit.

The Wheatstone bridge connection and the connections with other integrated circuit elements are made by conductors forming part of the integrated circuit, these conductors not being shown. A Wheatstone bridge is a structure having a low input impedance, the imbalance of which can be easily measured by a differential voltage amplifier.

Figure 8:
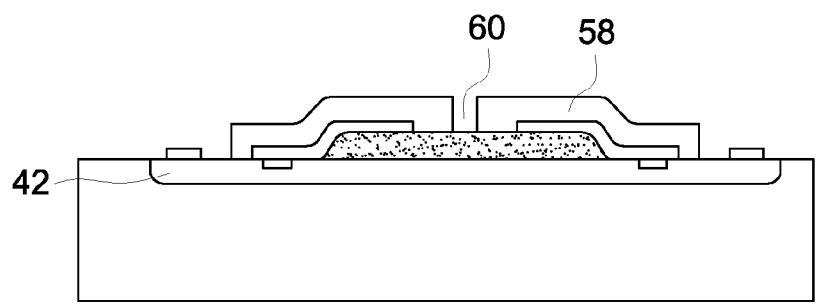

The next step (FIG. 8) comprises the deposition, then etching, of a layer 58 of material that will constitute the pressure-sensitive self-supporting diaphragm. This layer is a layer of insulating material. Silicon nitride deposited at low temperature (below 450° C.) is the preferred material because it has good properties: self-supportability, elasticity, vacuum sealing and resistance to external chemical attack. By depositing it at low temperature, the underlying electronic circuit 42 is not degraded. The layer could consist of several sublayers of different materials. Typically, the thickness is of the order of one micron or a few microns. The etching is carried out so as to form a diaphragm that completely covers the island of sacrificial layer 52, including the points where the strain gages cover the island, and extends all around the island so as to provide a continuous rigid connection with the substrate. However, in the etching operation, or in a subsequent etching step, one or more small holes 60 are provided at the points where the diaphragm layer 58 is directly in contact with the sacrificial layer 52 (i.e. neither on top of the gages nor on top of the substrate). A single small hole 60 has been shown for convenience at the center of the diaphragm, but in practice a series of small holes distributed over the periphery of the diaphragm will instead be provided. The purpose of these holes is to allow subsequent etching of the sacrificial layer.

Figure 9:
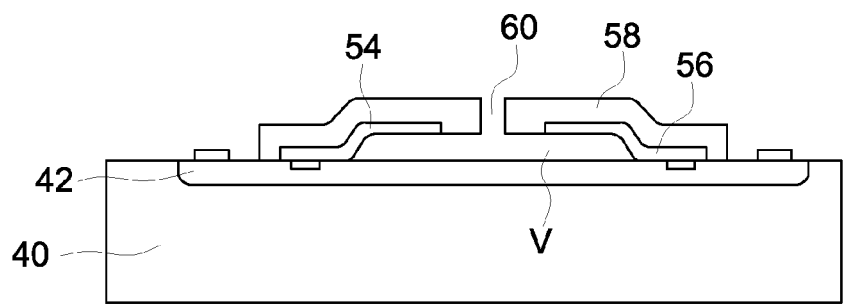

FIG. 9 shows this removal step. By anisotropic chemical etching through the holes 60, the sacrificial layer is dissolved and completely removed, leaving behind a cavity V occupying the entire space previously occupied by the island of sacrificial layer. The etchant must not etch the diaphragm nor the gages, nor the integrated circuit elements formed in the substrate inside the cavity V.

Figure 10:
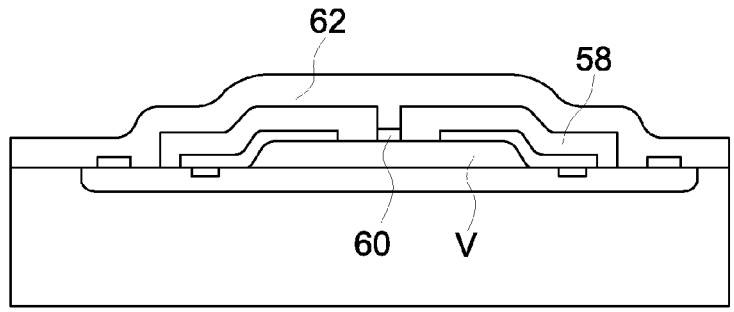

At this stage, the cavity must be plugged. FIG. 10 shows the deposition of a layer 62 of a material having a high covering power, which fills the hole 60 without penetrating too far into the cavity, as shown in FIG. 10. Silicon nitride or silicon oxide may be suitable. The deposition is preferably carried out at very low pressure (less than 50 Pa) so as to create a vacuum in the cavity before plugging it.

Figure 11:
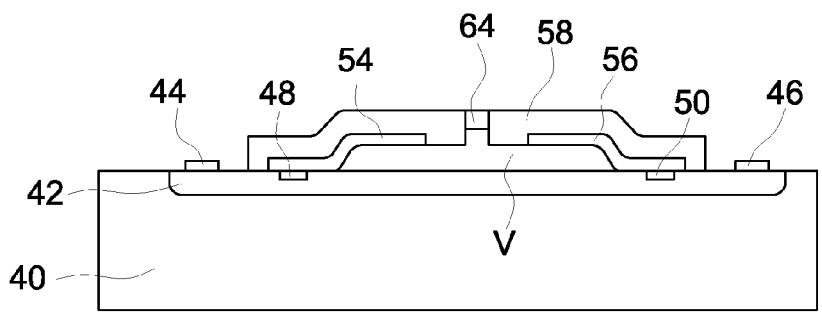
FIG. 11 shows, in lateral section, the structure of a sensor according to the invention, obtained after the steps described in the previous figures.

This layer 62 is then uniformly etched (or, if desired, etched through a mask) so as to leave only a plug 64 in each small aperture 60 (FIG. 11). This layer may also be left entire, notably if it is made of the same material as the diaphragm, in which case it becomes part of the diaphragm.

After these steps, the gages are completely protected from external chemical attack since they are inside the cavity.

Figure 12:
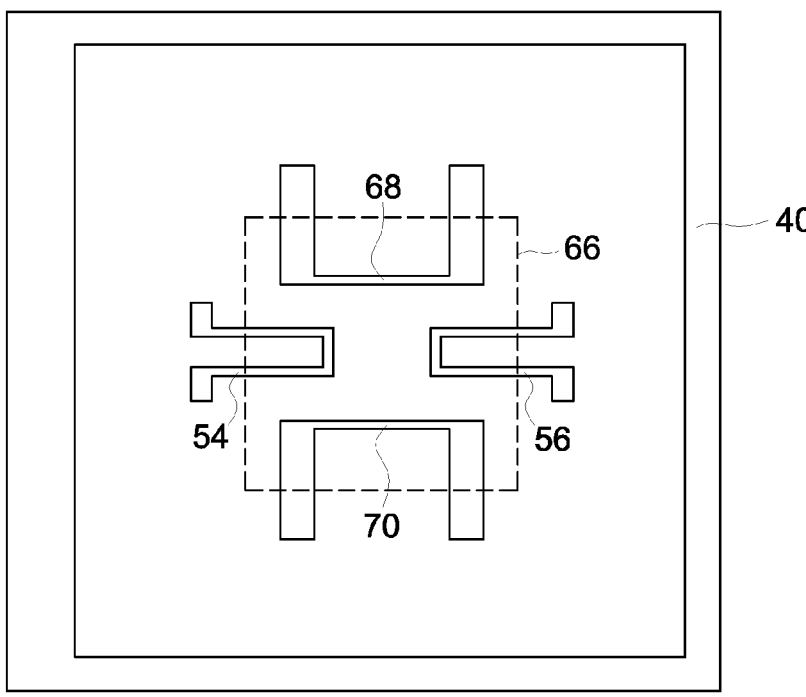
FIG. 12 shows, in a top view, the structure of the sensor.

FIG. 11 shows the pressure sensor at this stage of the fabrication. FIG. 12 shows a possible configuration, seen from above, of the strain gages. The diaphragm is represented as a square shape (dashed line 66), but it could be circular. There are four pairwise symmetrical gages: 54 and 56; 68 and 70. The ends of these gages, lying outside the diaphragm, come into contact with the zones of the substrate such as 48 and 50 to be connected together, to a voltage supply and to the measurement amplifiers. The design of the gages is preferably such that the two gages 54 and 56 are subjected to stress opposed to the stress undergone by the gages 68 and 70 when there is a variation in the pressure exerted on the entire diaphragm.

It is important to note that the measurement circuit elements and even the entire integrated circuit in the substrate (with the exception of the zones for contact with the gages and the pads for connection to the outside) may be located beneath the diaphragm 58, something which was not possible in the prior techniques, in particular the capacitive techniques.

The resistance strain gages have not been protected from the environment or from chemical etching baths by a thin protection layer. The gages therefore experience the maximum possible deformation and therefore deliver the maximum possible signal. The addition of a protection layer would in fact increase the stiffness of the diaphragm and would also cause the gage to approach the neutral fiber of the diaphragm. The term "neutral fiber" is understood to mean the median axis of the diaphragm (for a homogeneous material). At the extreme, the deformation of the gage is zero if it is located on the neutral fiber. It should be noted that the effect of a protection layer is greater the thinner the diaphragm, this being the case for this type of highly integrated sensor.

To give an example with a silicon nitride diaphragm with a thickness of 1 micron and a diameter of 120 microns, the relative elongation of a gage may be around $7 \times 10^{-4}$ for a pressure of 1 bar. With a four-resistor Wheatstone bridge supplied with a voltage of 3 volts, the signal obtained is about 4 minivolts, which is easy to amplify and quite sufficient for low-cost sensors.

For a very important application, namely the measurement of the pressure of vehicle tires, with a measurement range of 9 bar, it will for example be possible to have a thickness of 4 microns and a diameter of 200 microns, giving a deformation of around $12 \times 10^{-4}$. The deflection of the diaphragm will be less than 2 microns, this being compatible with the small thickness of the cavity.

At the end of the wafer-scale collective fabrication steps, the wafer is diced into individual sensor chips, the chips are connected to a base, for example via wires welded to the contact pads 44, 46, and are encapsulated in a package in such a way that the diaphragm remains exposed to the pressure to be measured. The gages remain protected even if the diaphragm is directly subjected to external attack.

It will be readily seen by ibe of ordinary skill in the art that the present invention fulfils all of the objects set forth above. After reading the foregoing specification, one of ordinary skill in the art will be able to affevt various changes, substitutions of equivalents and various aspects of the invention as broadly disclosed herein. It is therefore intended that the protection granted hereon be limited only by definition contained in the appended claims and equivalents thereof.

The invention claimed is:

1. A pressure sensor produced in a microelectronics technology, comprising:
    a substrate carrying electrical elements;
    a layer deposited on a rigid part of the substrate, said layer being locally separated from the substrate to form a cavity between the substrate and the layer, said cavity being hermetically sealed and said layer forming a diaphragm that is deformable under the effect of pressure outside the cavity; and
    at least one resistance strain gage fastened to the diaphragm and having a resistance that varies as a function of the deformation of the diaphragm,
    wherein the resistance strain gage is located inside the sealed cavity.

2. The pressure sensor as claimed in claim 1, wherein the cavity is located on top of the substrate, the substrate not being recessed to form the cavity or the diaphragm.

3. The pressure sensor as claimed in claim 2, wherein the cavity covers the major part of the measurement circuits associated with the strain gages.

4. The sensor as claimed in claim 2, wherein the diaphragm is made of silicon nitride.

5. The sensor as claimed in claim 2, wherein the diaphragm bears at least two, and preferably four, four resistance strain gages joined together in a four-resistor Wheatstone bridge.

6. The sensor as claimed in claim 2, wherein the strain gages are made of a nickel/copper/silicon alloy or a nickel/copper/manganese alloy.

7. The pressure sensor as claimed in claim 1, wherein measurement circuits associated with the strain gages are located within the cavity.

8. The sensor as claimed in claim 7, wherein the diaphragm is made of silicon nitride.

9. The sensor as claimed in claim 7, wherein the strain gages are made of a nickel/copper/silicon alloy or a nickel/copper/manganese alloy.

10. The sensor as claimed in claim 1, wherein the diaphragm is made of silicon nitride.

11. The sensor as claimed in claim 10, wherein the strain gages are made of a nickel/copper/silicon alloy or a nickel/copper/manganese alloy.

12. The sensor as claimed in claim 1, wherein the diaphragm bears at least four resistance strain gages joined together in a four-resistor Wheatstone bridge.

13. The sensor as claimed in claim 1, wherein the strain gages are made of a nickel/copper/silicon alloy or a nickel/copper/manganese alloy.

14. A process of manufacturing a strain-gage pressure sensor including a cavity sealed by a diaphragm, said process comprising:
  producing measurement electronic circuit elements on a rigid part of a planar substrate;
  depositing a sacrificial layer to define the volume of an empty cavity, and
  etching the sacrificial layer so as to leave an island of the sacrificial layer located above the electronic circuit elements;
  depositing a resistive layer on the sacrificial layer and etching resistance strain gages in the resistive layer;
  depositing, on the strain gages and on the sacrificial layer, at least one insulating layer that subsequently forms a self-supporting diaphragm fastened to the strain gages;
  etching said insulating layer so as to leave a diaphragm covering the entire sacrificial layer except at least an aperture at the point where the insulating layer is in contact with the sacrificial layer;
  attacking said sacrificial layer through the aperture by an etchant that does not attack the material of the resistance strain gages, so as to remove the totality of said sacrificial layer; and
  deposition a plugging material, for filling up the aperture so as to hermetically seal the cavity.

15. The process as claimed in claim 14, wherein the deposition of the plugging material is carried out at low pressure so that the cavity then remains void of air.

16. The process as claimed in claim 15, wherein the material of the sacrificial layer is tungsten and the strain gages are made of a nickel/chromium/silicon alloy or a nickel/copper/manganese alloy.

17. The process as claimed in claim 15, wherein the material of the sacrificial layer is an organic polymer.

18. The process as claimed in claim 14, wherein the material of the sacrificial layer is tungsten and the strain gages are made of a nickel/chromium/silicon alloy or a nickel/copper/manganese alloy.

19. The process as claimed in claim 18, wherein the proportions of the alloy are about 0.5/0.4/0.1 in the case of nickel/chromium/silicon and about 0.55/0.44/0.01 in the case of copper/nickel/manganese.

20. The process as claimed in claim 14, wherein the material of the sacrificial layer is an organic polymer.

* * * * *